United States Patent [19]

Openiano

[11] Patent Number: 5,636,538
[45] Date of Patent: Jun. 10, 1997

[54] VEHICLE ANTI-THEFT DEVICE SEPARATELY SIMULTANEOUSLY LOCKING TO THE VEHICLE'S STEERING WHEEL AT EACH OF TWO LOCATIONS

[76] Inventor: Renato M. Openiano, 934 Fuchsia La., San Diego, Calif. 92154

[21] Appl. No.: 514,238

[22] Filed: Aug. 11, 1995

[51] Int. Cl.⁶ .................................................. B60R 25/02
[52] U.S. Cl. ........................ 70/209; 70/236; 70/226; 70/DIG. 63
[58] Field of Search ........................... 70/209, 211, 212, 70/225, 226, 237, 238, DIG. 63

[56] References Cited

U.S. PATENT DOCUMENTS

| | | | |
|---|---|---|---|
| 1,443,009 | 1/1923 | Davis | 70/227 |
| 3,138,036 | 6/1964 | Carson | 70/211 |
| 4,747,279 | 5/1988 | Solow | 70/238 |
| 5,052,201 | 10/1991 | Liou | 70/209 |
| 5,138,853 | 8/1992 | Chen | 70/209 |
| 5,142,889 | 9/1992 | Liu | 70/209 |
| 5,197,308 | 3/1993 | Pazik | 70/209 |
| 5,199,284 | 4/1993 | Lin | 70/209 |
| 5,257,518 | 11/1993 | Hsieh | 70/209 |
| 5,297,406 | 3/1994 | Lin | 70/212 |
| 5,299,438 | 4/1994 | Chen | 70/209 |
| 5,457,972 | 10/1995 | Lo | 70/209 |
| 5,491,990 | 2/1996 | Von-Lambert | 70/226 |

*Primary Examiner*—Darnell M. Boucher
*Attorney, Agent, or Firm*—William C. Fuess

[57] ABSTRACT

A vehicular steering wheel security device, having three major members A,B,C each of which is telescoping relative to the others, and also key locks for each of A-B and B-C, separately simultaneously locks onto a steering wheel at rim positions (i) at and about a point where a spoke joins the rim, and (i) from this point across the diameter of the steering wheel to an opposite point. An elongate central member preferably has a double hook that selectively engages and protects not only an interior portion arcuate portion of the steering wheel's rim, but also the steering wheel's spoke. First and second members having single hooks telescope relative to, respectively, first and second ends of the central member for selectively engaging, respectively, (i) the rim of the steering wheel in position about the spoke and (ii) the rim of the steering wheel opposite to the spoke. The impediment presented by the locked device to turning the steering wheel is not subject to being defeated merely by cutting through either the steering wheel, or the device itself, at any single location.

10 Claims, 2 Drawing Sheets

VEHICLE ANTI-THEFT DEVICE SEPARATELY SIMULTANEOUSLY LOCKING TO THE VEHICLE'S STEERING WHEEL AT EACH OF TWO LOCATIONS

BACKGROUND OF THE INVENTION

1. Field of the Invention

The present invention generally concerns vehicular steering wheel security locks used to deter theft.

The present invention particularly concerns steering wheel security locks that, by their manner of attachment to a steering wheel, are not readily defeated by cutting either the steering wheel, or the lock, at but a single location.

2. Description of the Prior Art

U.S. Pat. No. 5,299,4384 for an AUTOMOBILE STEERING LOCK to Chen, et. al., describes a steering wheel lock that is operative to grab a single rim portion of a steering wheel between a single hook and a double hook. A like mechanism will be seen to be used as a portion of the security device of the present invention.

U.S. Pat. No. 5,375,441, for a LOCKING DEVICE FOR STEERING WHEEL to Liou likewise shows a device for locking a rim portion of a steering wheel.

U.S. Pat. No. 5,253,497 for a MULTI-FUNCTION AUTOMOBILE STEERING LOCK to Hsieh, and U.S. Pat. No. 5,259,222 for a SPECIAL FUNCTION OF LOCKING SYSTEM WITH THEFT-PROTECT FOR CAR EQUIPMENTS to Jang, both show steering locks having complex structure in order to perform more than one function.

U.S. Pat. No. 5,284,037 for an AUTOMOBILE STEERING LOCK to Chen, et. al., shows a steering wheel lock having multiple sections. The security device of the present invention will also be seen to employ multiple sections.

U.S. Pat. No. 5,239,849 for an AUTOMOBILE AND PROPERTY ANTI-THEFT APPARATUS shows a protective device having a dual purpose to both lock a steering wheel and provide a protective enclosure for small articles.

In general, the prior art devices are subject to having their security function defeated by the physical act of cutting or sawing the devices and/or the steering wheel to which the devices are attached. It would be useful if a security device could offer some approach other than physical strength and resistance to preventing its defeat. After all, the strength of the security device does not generally improve the strength of the steering wheel. One security device that does so is shown in U.S. Pat. No. 5,353,614 for a VEHICLE STEERING WHEEL LOCK to Anderson. The Anderson lock shrouds all or substantially all of the entire steering wheel in a steel case, and is accordingly very large, heavy and cumbersome—as well as potentially very secure.

It would accordingly be desirable if some security device could exhibit an at least modestly improved resistance to being defeated in its security function by such cutting and sawing activities as may be undertaken against either, or both, the device and/or the steering wheel to which the device is attached.

SUMMARY OF THE INVENTION

The present invention contemplates a vehicular steering wheel security device that locks onto a steering wheel, presenting such an impediment to turning the wheel as deters or effectively precludes theft of the vehicle, at each of two locations on the wheel. The security function of the device is thus not subject to being defeated merely by cutting through either the steering wheel, or the device itself, at any single location.

In simplest terms, the steering wheel security device of the present invention has not just one, but rather two, telescoping assemblies. It preferably also has not just one, but rather two, key locks.

A first locking assembly having two telescoping parts fits to the steering wheel at and about the junction of a spoke and the rim of the steering wheel. A second locking assembly, having two telescoping parts—a one of which is also part of the first telescoping assembly—fits across the diameter of the steering between opposite points on the rim, much in the manner of a conventional steering wheel lock. If either the first or the second locking assemblies, or the steering wheel at some region of its attachment to either of these two assemblies, is broken such as b} cutting, then the remaining assembly, and steering wheel portions, still function to remain attached and to prevent unfettered rotation of the steering wheel.

In its preferred embodiment a vehicular anti-theft device in accordance with the present invention is for attachment to a circularly bent and contoured steering wheel having a hub an a rim and radially-extending spoke members between the hub and rim. The device has a central member and two, a first and a second, telescoping "hook members". The central member consists of (i) a longitudinally extending elongate frame and (ii) a double hook that is permanently fixed on a middle portion of the frame and that extends therefrom in a first direction. The double hook serves to selectively capture and release an interior portion arcuate portion of a rim, in and about a position of a spoke, of the circularly bent and contoured, rimmed, spoked steering wheel when the elongate frame is positioned across and along a diameter of the steering wheel.

A first telescoping hook member variably affixes to, and interacts with, the central member. This first telescoping hook member has, as does the central member, an elongate portion. This elongate portion telescopes relative to a first-end region of the central member's elongate frame. Another, hook, portion is permanently fixed at a second-end region of the telescoping elongate portion. The hook portion extends in a second direction that is opposite to the first direction. It serves to releasable capture the exterior portion arcuate portion of the steering wheel in the position of the spoke.

By this construction, when the central member is positioned across and along a diameter of the steering wheel, and the first telescoping hook member's elongate portion is telescoped in position relative to the first-end region of the central member, then the arcuate portion of the rim in and about the position of the spoke is captured between (i) the central member's double hook and (ii) the first telescoping hook member's hook portion.

Yet another, second, telescoping hook member variably affixes to, and interacts with, the central member. This second, telescoping hook member again has an elongate portion. This elongate portion telescopes relative to a second-end region of the central member's elongate frame. A hook portion is permanently fixed at a second-end region of the telescoping elongate portion, and extends from this region in the second direction. The hook portion serves to selectively capture and release an interior portion arcuate portion of the steering wheel opposite to the position of the spoke.

By this construction, when the central member is positioned across and along a diameter of the steering wheel, and the second telescoping hook member's elongate portion is telescoped in position relative to the second-end region of the central member, then the rim is captured between (i) the central member's double hook and (ii) the second telescoping hook member's hook portion.

One, and more preferably two, locks serve to selectively separately lock each of (i) the first telescoping hook member's elongate portion in telescoped position relative to the first-end region of the central member, and (ii) the second telescoping hook member's elongate portion in telescoped position relative to the second-end region of the central member. By the first, (i), locking, the arcuate portion of the rim in and about the position of the spoke between the central member's double hook and the first telescoping hook member's hook portion is captured. By the second, (ii), locking the rim between the central member's double hook and the second telescoping hook member's hook portion is captured.

In details of construction, the first telescoping hook member's elongate portion preferably telescopes over the first-end region of the central member's elongate frame. The first-end region of the central member's elongate frame is preferably constructed as an elongate rod having and presenting a plurality of annular grooves, while the first telescoping hook member's elongate portion is preferably constructed in the form of a tube telescoping over the grooved first-end region of the central member's elongate frame. A lock permanently fixed on the first telescoping hook member's tube selectively engages the grooves of the central member's first-end region elongate rod.

Finally, shield plates affixed to each of the central member in the region of its double hooks, and also to the first telescoping hook member in the region of its hook portion, serve, in combination with other elements, to effectively isolate the double hooks, and the hook portion from being accessible to a small circular saw. Because these double hooks, and hook portion, are the mechanically most vulnerable portion of the mechanism to being defeated by being sawed off, the shield plates provide an extra degree of security, and help make the anti-theft device of the present invention very hard to defeat by force.

Likewise in details of construction, the second telescoping hook member's elongate portion preferably telescopes within the second-end region of the central member's elongate frame. The second-end region of the central member's elongate frame is preferably constructed as a tube telescoping over the second telescoping hook member's elongate portion, while the second telescoping hook member's elongate portion is preferably constructed as an elongate rod having and presenting a plurality of annular grooves. A lock permanently fixed on the central member's tube selectively engages the grooves of the second telescoping hook member's elongate rod.

These and other aspects and attributes of the present invention will become increasingly clear upon reference to the following drawings and accompanying specification.

DESCRIPTION OF THE PREFERRED EMBODIMENT

Figure 1:
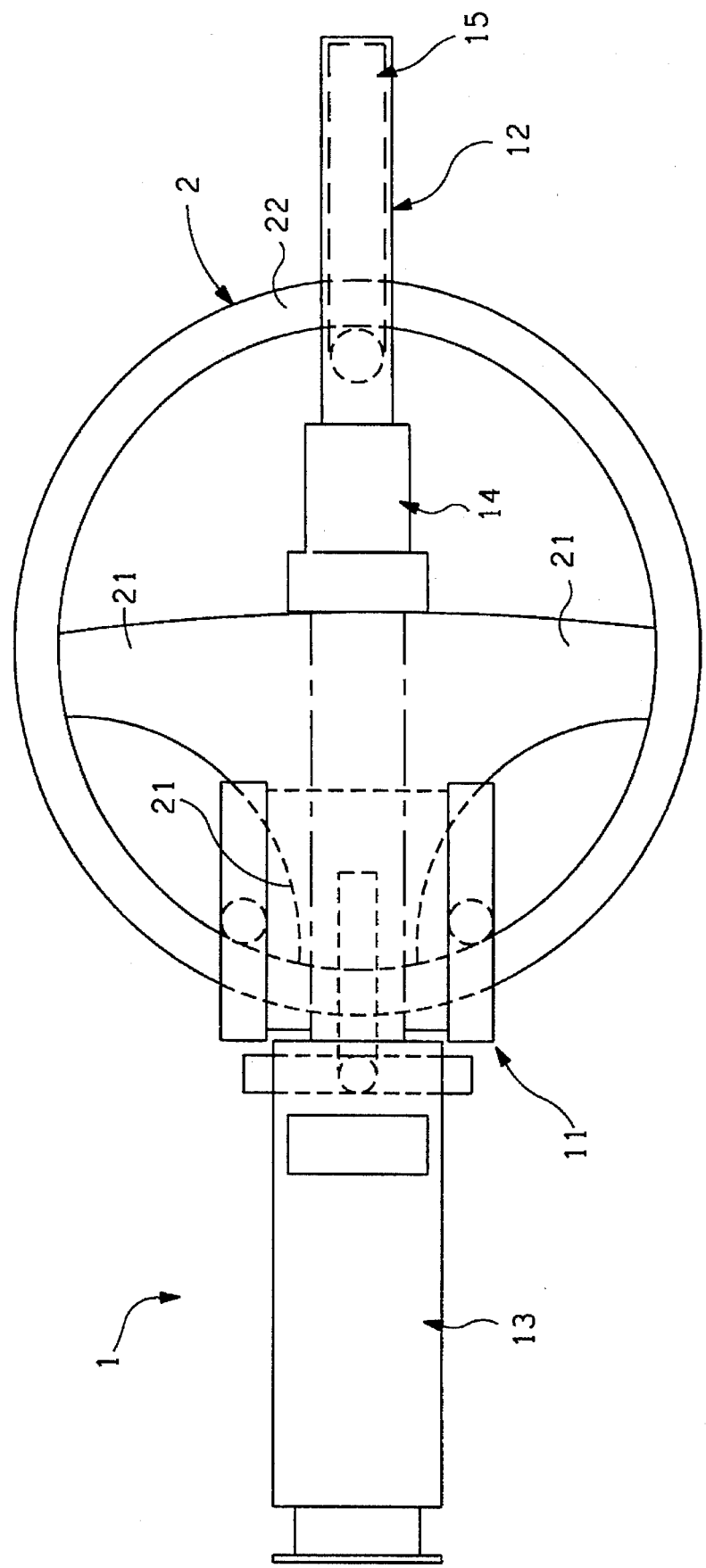
FIG. 1 is diagrammatic perspective view showing a preferred embodiment of a vehicle anti-theft device in accordance with the present invention, the device separately simultaneously locking to the vehicle's steering wheel at each of two locations.

A preferred embodiment of a vehicle anti-theft device 1 in accordance with the present invention is shown affixed to a steering wheel 2 (shown in phantom line for not being part of the invention) in FIG. 1. The anti-theft device 1 incorporates two separate locking mechanisms: a "back" locking mechanism 11 and a "front" locking mechanism 12. The device 1 is installed so that the back locking mechanism 11 centers on one of the braces, or spokes, 21 of the steering wheel 2 (as illustrated). The device 1 is further installed so that its front locking mechanism 12 engages, and retains, the rim 22 of the steering wheel 2 at a position along such rim 22 that is opposite to the point that is engaged by the front locking mechanism 11.

When the Anti-Theft Device 1 is so installed, its function to prevent the easy turning of the steering wheel 2 cannot be defeated merely by cutting or sawing the steering wheel 2 at a single location. For example, severing the steering wheel along any of the dashed lines A—A, B—B, C—C, or D—D may suffice to remove one of the locking mechanisms 11, 12—normally front locking mechanism 12—but will not suffice to remove the remaining locking mechanism 11 or 12—normally back locking mechanism 11.

Likewise, sawing the Anti-Theft Device 1 itself, normally in the region of its central member 14 and/or its right (with the relation to FIG. 1) telescoping member 15, will not suffice to completely dislodge the device 1 from the steering wheel 2. Namely, and although the front locking device 12 may be dislodged, the back locking device 11 continues to remain affixed to the steering wheel 2 and about the spoke 21. Notably, the back locking mechanism 11, which is the harder to defeat, substantially surrounds, and strongly protects, the spoke 21 and a portion of the rim 22 of the steering wheel 2 to which it is affixed.

According to these provisions and this operation, the anti-theft device 1 in accordance with the present invention is generally more securely attached, and harder to defeat in its security function, than is a standard steering wheel lock of the prior art.

Figure 2:
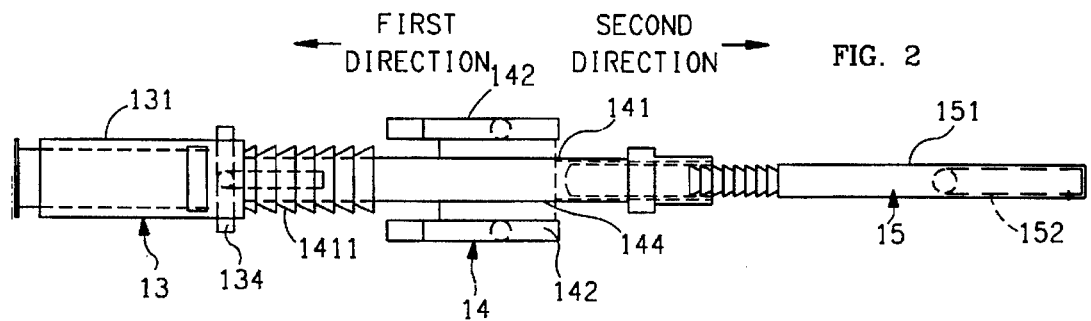
FIG. 2 is a top plan view of the preferred embodiment of the vehicle anti-theft device in accordance with the present invention previously seen in FIG. 1.
Figure 3:
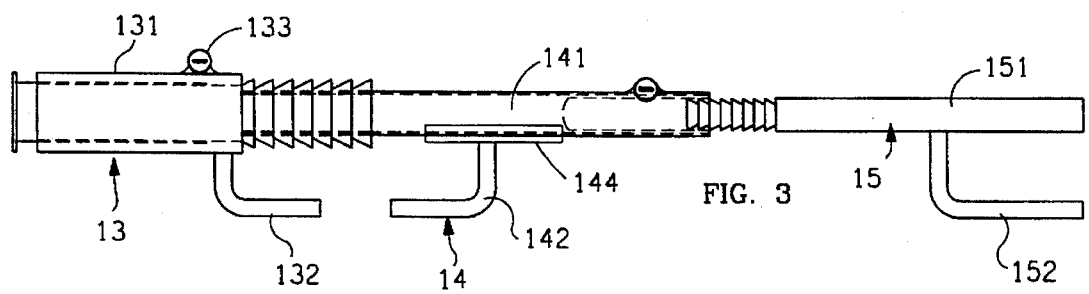
FIG. 3 is a side plan view of the preferred embodiment of the vehicle anti-theft device in accordance with the present invention previously seen in FIG. 1.
Figure 4:
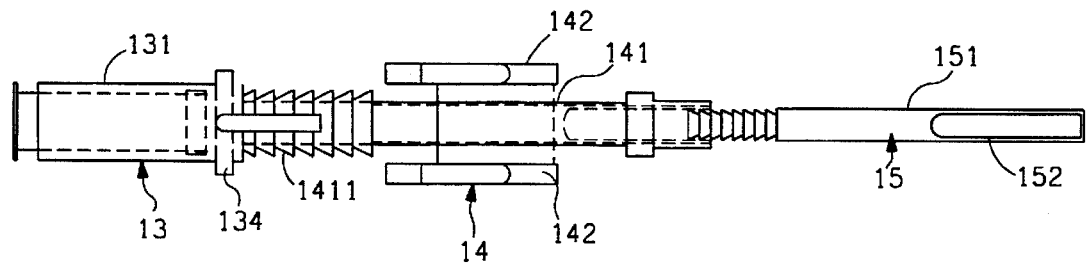
FIG. 4 is a bottom plan view of the preferred embodiment of the vehicle anti-theft device in accordance with the present invention previously seen in FIG. 1.
Figure 5:
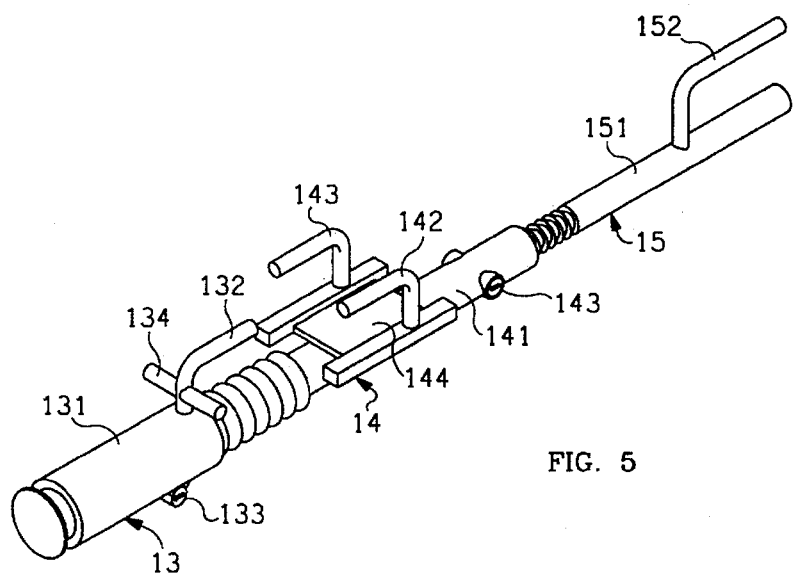
FIG. 5 is a bottom perspective view of the preferred embodiment of the vehicle anti-theft device in accordance with the present invention previously seen in FIG. 1.

Respective top, side, and bottom plan views of the anti-theft device 1 of the present invention, previously seen in FIG. 1, are respectively shown in FIGS. 2-4. A bottom perspective view of the same Anti-Theft Device 1 is shown in FIG. 5. Each of a left (as shown in the figures) member 13, a central member 14, and a right member 15 are telescoping relative to one another. The central member 14 has and presents a longitudinally extending elongate frame 141 (axis show in dashed lines in FIG. 3, and double hooks 142 permanently affixed at approximately a middle region of the frame 141. The double hooks 142 extend (as is best shown in FIGS. 3 and 5) in the direction of the arrow FIRST DIRECTION shown in FIG. 2, which direction shall hereafter be referred to as the "first direction". The double hooks 142 (lying on an axis parallel to the longitudinal axis of the central member in combination with the longitudinally extending elongate frame 141 serve to selectively capture and release an interior arcuate portion of the rim 22 of the steering wheel 2, in and about a position of a spoke 21, as is shown in FIG. 1. The double hooks 142 so operate when the elongate frame 141, the central member 14, and the entire anti-theft device 1 is positioned across, and along, the diameter of the steering wheel 2 (shown in FIG. 1).

An optional shield plate 144 is affixed to the central member 14 in the region of its double hooks 142. This shield plate 144 will interact with a like shield plate 134 on the first telescoping hook member 13 in the region of its hook portion 132, in a manner to be explained.

The left, or first, member 13 telescopes relative to the central member 14. The first member 13 includes an elongate portion 131 and a hook portion 132. The elongate portion 131 is preferably in the configuration of a sleeve which slides over an extension in the first direction of the elongate frame 142 of the central member 14. However, this relationship can be reversed and the "first direction" extension of the frame 141 can be hollow, with the elongate portion 131 of the left member 13 telescoping within this hollow portion. In the preferred configuration, as illustrated, the extension of the frame 141 of the central member 14 in the first direction is possessed of annular grooves, or teeth, 1411. These grooves are preferably in the cross-section of a sawtooth, or triangle, as illustrated.

The left member 13 is also possessed of a first lock 133, normally a key lock. The lock 133 may be selectively engaged or disengaged to permit the sliding movement of the left member 13 along the frame 141 of the Central Member 14. In particular, the left member 13 may be slid in the second direction so that an arcuate portion of the rim 22, and also a spoke 21, of the steering wheel 22 (shown in FIG. 1) will be engaged, and held, between (i) the double hooks 142 of the central member 14 and (ii) the single hook 132 of the left member 13. Conversely, the left member 13 may be slid in the first direction in order to open the gap between its hook 132 and the double hooks 142 of the Central Member 14 (as illustrated in FIGS. 2–5), thereby permitting the extraction of the Anti-Theft Device 1 from off the steering wheel 2 (shown in FIG. 1).

An optional shield plate 134 is affixed to the first telescoping hook member 13 in the region of its hook portion 132. This shield plate 134 interacts with the like shield plate 144 on the central member 14 in the region of its double hooks 142. The two shield plates 134, 144 serve, in combination with other structural elements of the members 13, 14, to effectively isolate the double hooks 142 of the central member 14, and also the hook portion 132 of the first telescoping hook member 13, from being accessible to a circular saw blade, particularly to the small circular saw blade of a battery-powered small circular saw. The shield plates 134, 144 thus serve, in combination with other elements, to effectively isolate the double hooks 142, and the hook portion 132 from being accessible to being sawed into pieces by use of a small circular saw. Because these double hooks 142, and hook portion 132, are perhaps mechanically the most vulnerable portion of the device 1 to being defeated by being sawed off, the shield plates 134, 144 provide an extra degree of security, and help make the anti-theft device 1 of the present invention very hard to defeat by force.

Another, right, second, telescoping member 15 is disposed in the second direction from the central member 14. This right, or second, telescoping member 15 consists of—similarly to the left, first, telescoping member 13—an elongate portion 151 and a hooked portion 152. The elongate portion 151, and the entire right, or second, telescopic member 15, are telescoping in position relative to the central member 14. This telescoping is independent of the telescoping of the first, or left, member 13.

The elongate portion 151 of the second, or right member 15, normally presents in its first-direction end region a rod having a number of circumferential grooves, or channels, or teeth. This toothed portion of the rod of the elongate portion 151 of the right, or second, member 15 fits within a corresponding hollow cavity in the elongate frame 141 of the Central Member 14. The telescoping relationship of the members 14, 15 may be reversed: the second-direction end region of the central member 14 may terminate in a rod that is received into a sleeve at the first-direction end region of the right member 15.

When the right member 15 is telescoped to an extension from the central member 14, then its hooked portion 152 selectively captures and engages an interior arcuate portion of the rim 22 of the steering wheel 2, as shown in FIG. 1. This arcuate portion of the rim 22 of steering wheel 2 is, as is illustrated in FIG. 1, substantially opposite to the arcuate portion that is simultaneously engaged by the back locking mechanism 11.

As with the lock 133 controlling the telescoping between the left, or first member 13 and the central member 14, the lock 143 controls the telescoping between the right, or second member 15 and the central member 14. The lock 143 is normally located on the exterior of the two telescoping members, which is, in the preferred embodiment, the central member 14. The lock 143 is preferably a key lock, and more preferably uses the same key as does lock 133. This need not, however, invariably be the case. When the keys are not the same, the anti-theft security device 1 in accordance with the present invention presents a convenient means for controlling that a vehicle should not be operated save by authorization of two individuals each of which is uniquely possessed of an associated key.

The vehicle anti-theft device 1 operates in a substantially conventional manner for a steering wheel lock. Namely, when the device 1 is affixed by locking (in two places) to the steering wheel 2 (shown in FIG. 1), then the elongate extension of the elongate portion 131 of the first, or left, telescoping member 13 extends well beyond the rim 22 of wheel 2, and precludes, by contact with other parts of a vehicle in which the steering wheel 2 is present, a full and free rotation of the steering wheel 2, and the necessary and adequate steering of the vehicle.

Substantially, all portions of all members of the anti-theft security device 1 are circular in cross-sectioned, as is indicated in the bottom perspective view of FIG. 5. All elements are preferably constructed of appropriately hardened steels. It should be noted, in particular, that the double hooks 142 of the central member 14 serve to surround, and protect, both the single hook 132 of the left, or first, member 13 and also the spoke 21 of steering wheel 2 about which spoke 21 the rear locking mechanism 11 is affixed.

This protection, and the structure shown, makes it very difficult to dislodge, in particular, the rear locking mechanism 11 from the steering wheel 2 without the proper use of the key. Therefore, and by this construction, the most common point of vulnerability of prior art steering wheel lock and mechanism,—either the steering wheel rim or the elongate extension of the steering wheel lock itself—is substantially avoided by the device 1 of the present invention.

As a potential variant of the present invention, it may be imagined that the left, or second extension 15 consists of two elongate portions each joined to an associated hook portion as the two legs of a member the substantial form of a "Y". The stem of the "Y" would be telescoping so as to engage, as before, the central member 14. By such a construction it might be imagined that the device 1 would engage and hold against the steering wheel in three, as opposed to only two, positions. The particular utility of this construction would be that if one leg of the exposed "Y"-shaped right member were to be cut or sawed, or, conversely the steering wheel 2 was to be cut at the point of the engagement of a one leg, than the remaining leg of the Y, in combination with the back locking mechanism 11 and the Central and left members 14, 13, would still suffice to make a two-point security attachment to the steering wheel.

In accordance with the preceding explanation, variations and adaptations of a steering wheel anti-theft security device in accordance with the present invention will suggest themselves to a practitioner of the mechanical design arts.

In accordance with these and other possible variations and adaptations of the present invention, the scope of the invention should be determined in accordance with the following claims, only, and not solely in accordance with that embodiment within which the invention has been taught.

What is claimed is:

1. A vehicular anti-theft device for attachment to a circularly bent and contoured steering wheel having a hub an a rim and radially-extending spoke members between the hub and rim, the device comprising:

a central member having
      a longitudinally extending elongate frame, and
      one only double hook, permanently fixed on a middle portion of the frame and extending therefrom in a first direction, for selectively capturing one only interior portion arcuate portion of a rim, about a position of a spoke, of a circularly bent and contoured rimmed spoked steering wheel when the elongate frame is positioned across and along a diameter of the steering wheel;

a first telescoping hook member having
      an elongate portion, telescoping relative to a first-end region of the central member's elongate frame, and
      a hook portion, permanently fixed at a second-end region of the telescoping elongate portion and extending therefrom in a second direction that is opposite to the first direction, for selectively capturing the exterior arcuate portion of the steering wheel in the position of the spoke when the central member is positioned across and along a diameter of the steering wheel, and the first telescoping hook member's elongate portion is telescoped in position towards the first-end region of the central member;

a second telescoping hook member having and presenting
      a elongate portion, telescoping relative to a second-end region of the central member's elongate frame, and
      a hook portion, permanently fixed at a second-end region of the telescoping elongate portion and extending therefrom in the second direction, for selectively capturing an interior arcuate portion of the steering wheel opposite to the position of the spoke when the central member is positioned across and along a diameter of the steering wheel, and the second telescoping hook member's elongate portion is telescoped in position away from the second-end region of the central member; and a locking means for selectively locking each of
      the first telescoping hook member's elongate portion in telescoped position relative to the first-end region of the central member, therein capturing the arcuate portion of the rim in and about the position of the spoke between the central member's double hook and the first telescoping hook member's hook portion, and
      the second telescoping hook member's elongate portion in telescoped position relative to the second-end region of the central member, therein capturing the rim between the central member's double hook and the second telescoping hook member's hook portion.

2. The vehicular anti-theft device according to claim 1 wherein the locking means comprises:
   a first lock selectively locking the first telescoping hook member's elongate portion in telescoped position relative to the first-end region of the central member; and
   a second lock selectively locking the second telescoping hook member's elongate portion in telescoped position relative to the second-end region of the central member.

3. The vehicular anti-theft device according to claim 1 wherein the first telescoping hook member's elongate portion telescopes over the first-end region of the central member's elongate frame.

4. The vehicular anti-theft device according to claim 3 wherein the first-end region of the central member's elongate frame comprises:
   an elongate rod having and presenting a plurality of annular grooves; and wherein the first telescoping hook member's elongate portion comprises:
   a tube telescoping over the grooved first-end region of the central member's elongate frame; and wherein the locking means comprises:
   a lock permanently fixed on the first telescoping hook member's tube for selectively engaging the grooves of the central member's first-end region elongate rod.

5. The vehicular anti-theft device according to claim 4 wherein the grooves of the central member's first-end elongate rod have the cross-section of a sawtooth.

6. The vehicular anti-theft device according to claim 1 wherein the second telescoping hook member's elongate portion telescopes within the second-end region of the central member's elongate frame.

7. The vehicular anti-theft device according to claim 6 wherein the second-end region of the central member's elongate frame comprises:
   a tube telescoping over the second telescoping hook member's elongate portion; and wherein the second telescoping hook member's elongate portion comprises:
   an elongate rod having and presenting a plurality of annular grooves; and wherein the locking means comprises:
   a lock permanently fixed on the central member's tube for selectively engaging the grooves of the second telescoping hook member's elongate rod.

8. The vehicular anti-theft device according to claim 4 wherein the grooves of the second telescoping member's elongate rod have the cross-section of a sawtooth.

9. The vehicular anti-theft device according to claim 1 wherein the central member further comprises:
   a shield plate connected to the central member's elongate frame; and wherein the first telescoping hook member further comprises:
   a shield plate connected to the first telescoping hook member's elongate portion so as to, in combination with the central member's shield plate, physically shield the central member's double hook, and also the first telescoping member's hook portion, from being accessible to a small circular saw blade of a battery-powered small circular saw.

10. A locking device for a circularly bent and contoured rimmed spoked steering wheel comprising:

an elongate central member having one protruding hook formed thereon for selectively engaging an interior first arcuate portion of a rim about a position of a spoke, of a circularly bent and contoured rimmed spoked steering wheel said member having a first longitudinal axis and said hook lying along a second axis parallel to the longitudinal axis;

a first telescoping member having a second hook, telescoping along the longitudinal axis towards a first end of the elongate central member for selectively engaging an exterior of the first arcuate portion of the rim of the steering wheel in the position of the spoke;

a first lock means for selectively locking the first telescoping member in a position relative to the central member so that a first annular portion of the steering wheel about the spoke is engaged between the hooks of the first member and the central member;

a second telescoping member having a hook portion, telescoping along the longitudinal axis away from a second end of the elongate central member; said hook portion is adapted to selectively engage an interior second arcuate portion of the rim of the steering wheel in a position opposite to the spoke; and a second lock means, independent of the first lock means, for selectively locking the second telescoping member in a position relative to the central member so that the steering wheel is engaged across its full diameter between the second member and the central member;

wherein the first arcuate portion of the steering wheel is locked by the locking device separately and independently of the second arcuate portion; a simultaneous locking of the device locks the full diameter of the steering wheel.

* * * * *